(12) United States Patent
Arakawa et al.

(10) Patent No.: US 12,275,385 B2
(45) Date of Patent: Apr. 15, 2025

(54) CONTROL DEVICE FOR AUTOMATIC STOP OF VEHICLE

(71) Applicant: Honda Motor Co., Ltd., Tokyo (JP)

(72) Inventors: Ryohsaku Arakawa, Tokyo (JP); Hirotomo Muroi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 216 days.

(21) Appl. No.: 17/947,158

(22) Filed: Sep. 18, 2022

(65) Prior Publication Data
US 2024/0092322 A1    Mar. 21, 2024

(51) Int. Cl.
*B60T 7/22* (2006.01)
*G01S 13/86* (2006.01)
*G01S 13/931* (2020.01)

(52) U.S. Cl.
CPC ............. *B60T 7/22* (2013.01); *G01S 13/862* (2013.01); *B60T 2210/32* (2013.01); *G01S 2013/93185* (2020.01)

(58) Field of Classification Search
CPC ...... B60T 7/22; B60T 2210/32; G01S 13/862; G01S 2013/93185
USPC .......................................... 701/96, 301, 519
See application file for complete search history.

(56) References Cited

U.S. PATENT DOCUMENTS

| | | | |
|---|---|---|---|
| 7,741,961 B1 * | 6/2010 | Rafii | G06T 7/70 348/148 |
| 11,597,383 B1 * | 3/2023 | Sonalker | G06V 10/82 |
| 12,013,693 B1 * | 6/2024 | Chan | G05D 1/0289 |
| 2010/0076710 A1 * | 3/2010 | Hukkeri | G01S 7/4004 702/97 |
| 2017/0120814 A1 * | 5/2017 | Kentley | B60Q 5/008 |
| 2019/0354109 A1 * | 11/2019 | Pierson | B60T 7/22 |
| 2020/0139784 A1 * | 5/2020 | Sridhar | B60G 21/08 |
| 2020/0217952 A1 * | 7/2020 | Rider | G01S 13/58 |
| 2021/0080761 A1 * | 3/2021 | Zilkie | H01S 5/0085 |
| 2021/0183093 A1 * | 6/2021 | Park | G06V 20/588 |
| 2021/0284194 A1 | 9/2021 | Kijima | |
| 2022/0410881 A1 * | 12/2022 | Young | B60W 30/095 |
| 2023/0063930 A1 * | 3/2023 | Ichida | G06V 20/597 |

(Continued)

FOREIGN PATENT DOCUMENTS

| | | |
|---|---|---|
| CN | 113386787 | 9/2021 |
| JP | 2019064317 | 4/2019 |

(Continued)

*Primary Examiner* — Manglesh M Patel
(74) *Attorney, Agent, or Firm* — JCIPRNET

(57) ABSTRACT

A control device for automatic stop of a vehicle, wherein the vehicle includes a radar and a sonar, the radar detecting a distance to an obstacle and detecting a height of the obstacle from a road surface, the sonar detecting the distance to the obstacle and detecting a signal level of a reflected wave from the obstacle. The control device includes a control unit having a processor configured to output a signal for triggering the automatic stop of the vehicle when the signal level of the reflected wave from the obstacle is greater than a predetermined threshold, wherein the control unit is configured to change the predetermined threshold for triggering the automatic stop of the vehicle between a first predetermined threshold and a second predetermined threshold based on the height of the obstacle detected by the radar.

10 Claims, 7 Drawing Sheets

(56) References Cited

U.S. PATENT DOCUMENTS

| | | | |
|---|---|---|---|
| 2023/0092933 A1* | 3/2023 | Cooper | G01S 13/931 340/438 |
| 2023/0176190 A1* | 6/2023 | Westerhoff | G01S 13/42 342/70 |
| 2023/0242149 A1* | 8/2023 | Alferdaous Alazem | G01S 13/70 701/23 |
| 2024/0096105 A1* | 3/2024 | Zhao | G06V 10/44 |

FOREIGN PATENT DOCUMENTS

| | | | |
|---|---|---|---|
| WO | WO-2020008537 A1 * | 1/2020 | |
| WO | WO-2020105166 A1 * | 5/2020 | |

* cited by examiner

Radar

Sonar

CONTROL DEVICE FOR AUTOMATIC STOP OF VEHICLE

BACKGROUND

Technical Field

The disclosure relates to a control device of a vehicle, and more specifically relates to the control device for an automatic stop of the vehicle.

Description of Related Art

Conventionally, an ultrasonic sonar type braking system may be used to mitigate a collision between the vehicle and an obstacle in the road. There is an issue that the ultrasonic sonar may not be adept at differentiating a height of the obstacle. For example, the ultrasonic sonar may not be adept to differentiate between the obstacle having a relatively large height (for example, a wall, a pedestrian, a power pole, another vehicle and the like) and the obstacle having a relatively small height (for example, a step difference such as a curb on the road, a block, an edge of a manhole and the like). Therefore, automatic braking of the vehicle may be performed regardless if the obstacle has relatively large height or the obstacle has relatively small height.

However, user dissatisfaction may arise when the automatic braking of the vehicle is performed when the obstacle has relatively small height that may be overcome by the vehicle. That is to say, the user may desire the vehicle to ride up over the step difference (for example, the curb) instead of triggering the automatic braking for automatic stop of the vehicle.

Therefore, a solution is needed in which the automatic braking of the vehicle is not triggered in a case when the obstacle has relatively small height.

SUMMARY

According to an embodiment of the disclosure, a control device for automatic stop of a vehicle is provided, wherein the vehicle includes a radar system and a sonar system, the radar system detecting a distance to an obstacle and detecting a height of the obstacle from a road surface, the sonar system detecting the distance to the obstacle and detecting a signal level of a reflected wave from the obstacle. The control device includes a control unit having a processor configured to output a signal for triggering the automatic stop of the vehicle when the signal level of the reflected wave from the obstacle is greater than a predetermined threshold, wherein the control unit is configured to change the predetermined threshold for triggering the automatic stop of the vehicle between a first predetermined threshold and a second predetermined threshold based on the height of the obstacle detected by the radar system.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

Figure 1:
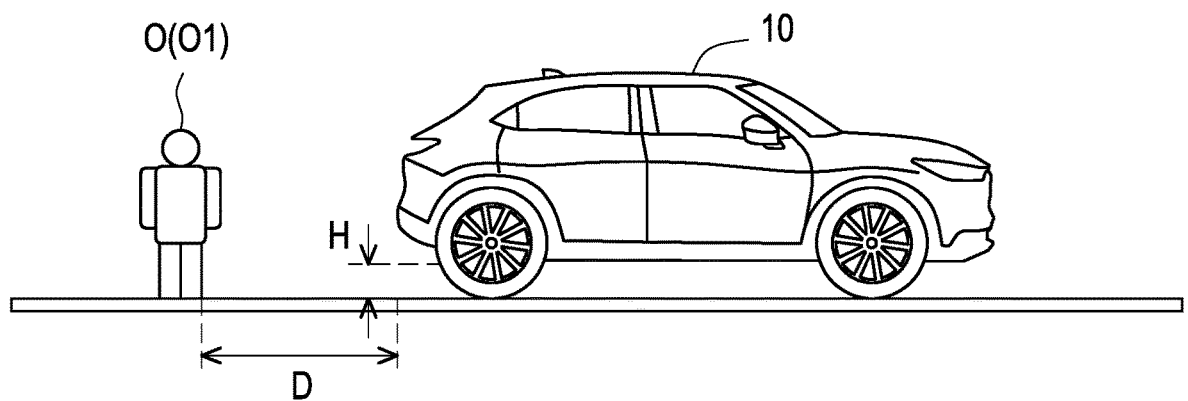
FIG. 1 is a schematic diagram illustrating a vehicle and a first obstacle according to an embodiment of the disclosure.
Figure 2:
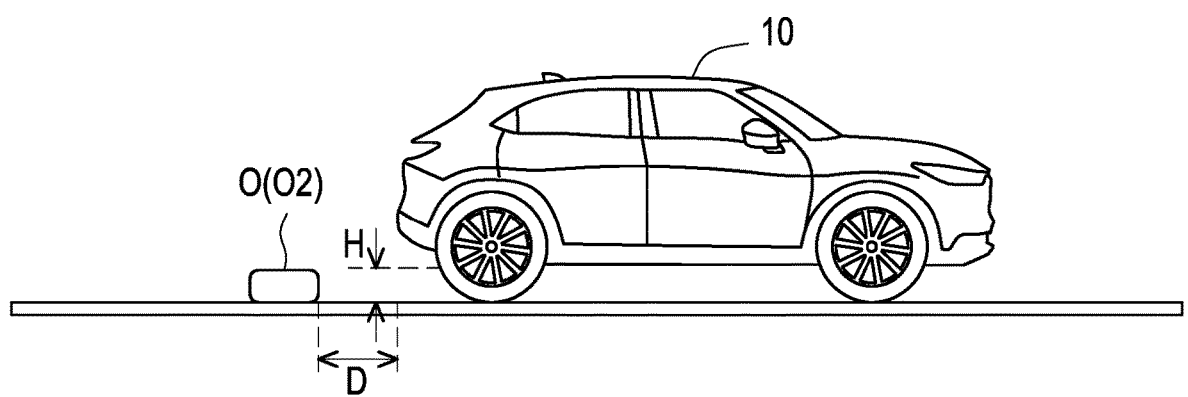
FIG. 2 is a schematic diagram illustrating a vehicle and a second obstacle according to an embodiment of the disclosure.

FIG. 1 is a schematic diagram illustrating a vehicle and a first obstacle according to an embodiment of the disclosure. FIG. 2 is a schematic diagram illustrating a vehicle and a second obstacle according to an embodiment of the disclosure. Referring to FIG. 1, a vehicle 10 is configured to detect a first obstacle O1. Referring to FIG. 2, the vehicle 10 is configured to detect a second obstacle O2. The first obstacle O1 and the second obstacle O2 are examples of an obstacle O. The first obstacle O1 is an example of the obstacle having relatively large height. The second obstacle O2 is an example of the obstacle having relatively small height. The first obstacle O1 may be, for example, a wall, a pedestrian, a power pole, another vehicle, and the like. However, the disclosure is not limited thereto. The second obstacle O2 may be, for example, a step difference in the road such as a curb, a block, an edge of a manhole and the like. However, the disclosure is not limited thereto.

In the present embodiment, the vehicle 10 is configured to ride up over the obstacle O2 having small height instead of triggering the automatic braking for automatic stop of the vehicle 10. In addition, the vehicle 10 is configured to trigger the automatic stop of the vehicle 10 when the obstacle O is the first obstacle O1 having large height. The vehicle 10 may determine, for example, the obstacle O having a height greater than a predetermined height H as the obstacle O having large height. On the other hand, the vehicle 10 may determine, for example, the obstacle O having a height lesser than the predetermined height H as the obstacle O having small height. The predetermined height H may be, a height that is less than a height of the bumper of the vehicle 10. The predetermined height H may be, for example, 10 cm. However, the disclosure is not limited thereto, and the predetermined height H may be set according to requirements.

Figure 3:
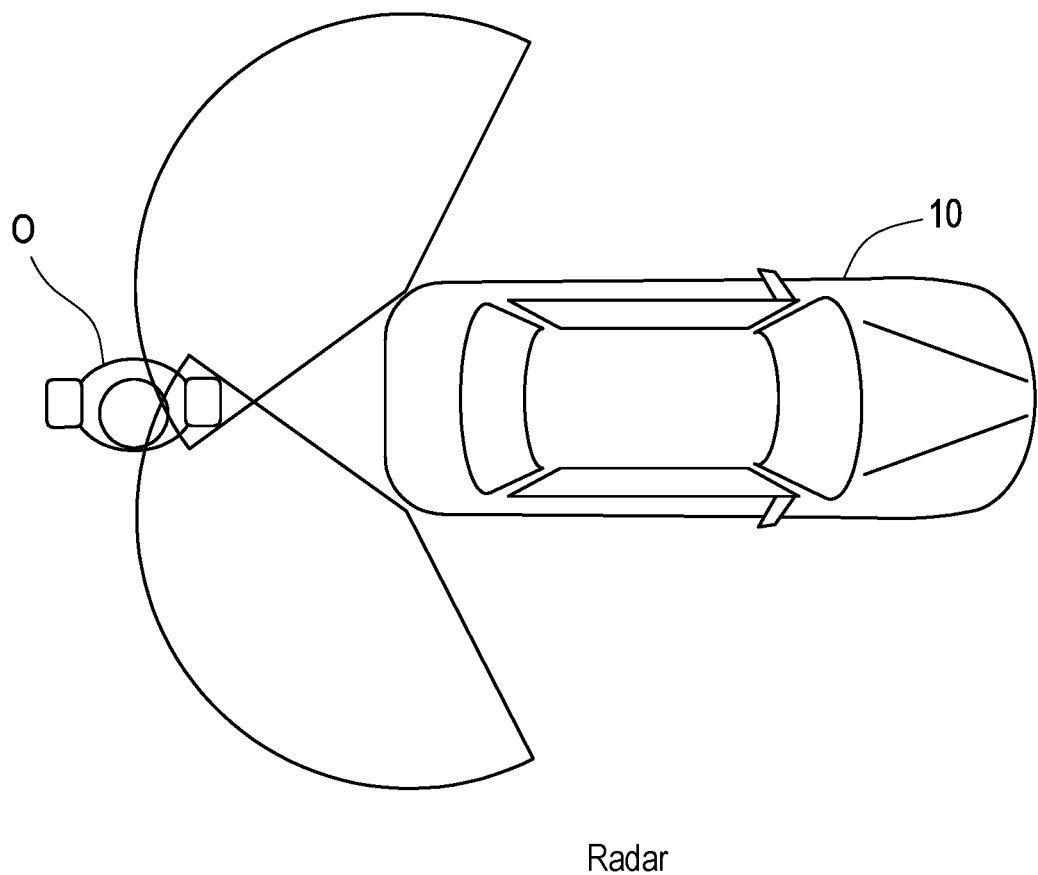
FIG. 3 is a schematic diagram illustrating a radar according to an embodiment of the disclosure.
Figure 4:
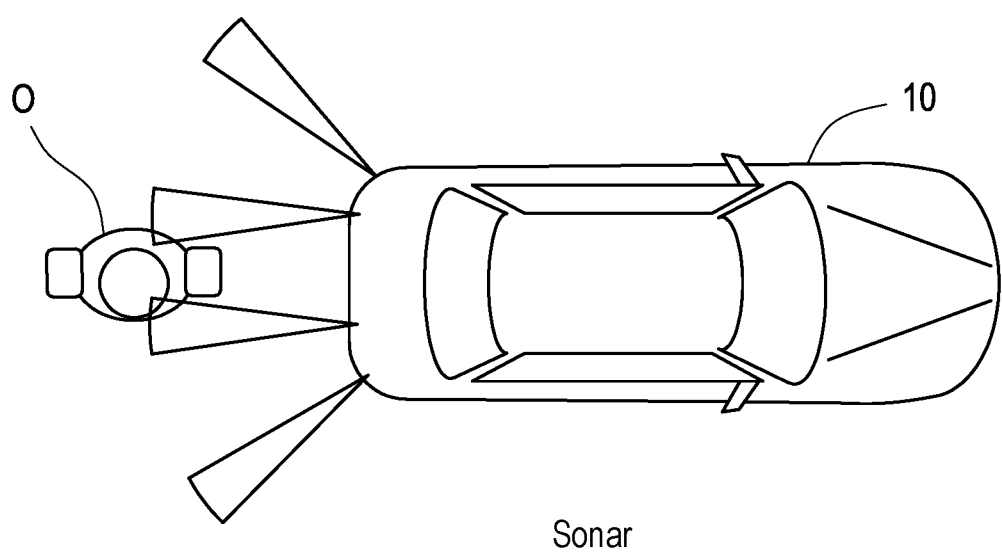
FIG. 4 is a schematic diagram illustrating a sonar according to an embodiment of the disclosure.

FIG. 3 is a schematic diagram illustrating a radar according to an embodiment of the disclosure. FIG. 4 is a schematic diagram illustrating a sonar according to an embodiment of the disclosure. Referring to FIG. 3 and FIG. 4, as described in the background section, the sonar may not be adept at differentiating a height of the obstacle. For example, the sonar may not be adept to differentiate between the obstacle having a relatively large height (for example, a wall, a pedestrian, a power pole, another vehicle and the like) and the obstacle having a relatively small height (for example, a step difference such as a curb on the road, a block, an edge of a manhole and the like).

Regarding sonar, the obstacle O having a complex shape such as a pedestrian will tend to absorb and diffuse sound waves. Therefore the energy of the reflected wave back to the sonar microphone is reduced. On the other hand, the obstacle O having a shape that stands out from the ground, such as a curb in the road, has a shape that is like a reflector that easily returns/reflects sound waves in the direction in which the sound wave arrived. Therefore, within the detection range of the sonar, the energy tends to be difficult to decrease (difficult to be absorbed and/or diffused) even if the distance to the object O is relatively large.

It may be possible to measure the height of the obstacle O using sonar by arranging a plurality of sonar microphones in a vertical direction. By arranging the plurality of sonar microphones in the vertical direction, a difference in the arrival time of the sound waves to each of the plurality of sonar microphones arranged in the vertical direction may be used to deduce the height of the obstacle O. However, using the plurality of sonar microphones may not be cost efficient. In the present disclosure, an embodiment of the disclosure may include a plurality of sonar microphones, and another embodiment of the disclosure may include only one sonar microphone.

Regarding radar, the obstacle O having a complex shape such as a pedestrian will tend to absorb and diffuse radio waves. Therefore, the energy of the reflected radio wave back to the radar antenna is reduced. However, for the obstacle O having a shape that stands out from the ground such as a curb in the road, that has a shape that is like a reflector that easily returns/reflects radio waves in the direction in which the radio wave arrived, the reflected energy still gradually decreases as the distance to the obstacle O increases.

It may be possible to measure the height of the obstacle O by using a radar, for example an array radar or phased array antenna, by arranging the antenna in a vertical direction. By arranging the antenna in the vertical direction, the angle in the vertical direction of the reflected radio wave may be calculated using a phase difference in the reflected radio wave detected by the array radar. In this way, the radar may differentiate between the obstacle having relatively large height (for example, the pedestrian) and the obstacle having relatively small height (for example, the step difference of the curb). In this way, the radar system may detect whether the obstacle O has a height greater than or lesser than the predetermined height H.

In terms of detecting the height of the obstacle O, the radar may be more cost efficient compared to the sonar. Therefore, the present disclosure uses the radar to differentiate between the obstacle having relatively large height and the obstacle having relatively small height. Furthermore, the present disclosure uses a combination of the radar and the sonar such that the radar may detect a distance to the obstacle O and detects a height of the obstacle O from a road surface, while the sonar may detect the distance to the obstacle O and detects a signal level of a reflected wave from the obstacle O.

Figure 5:
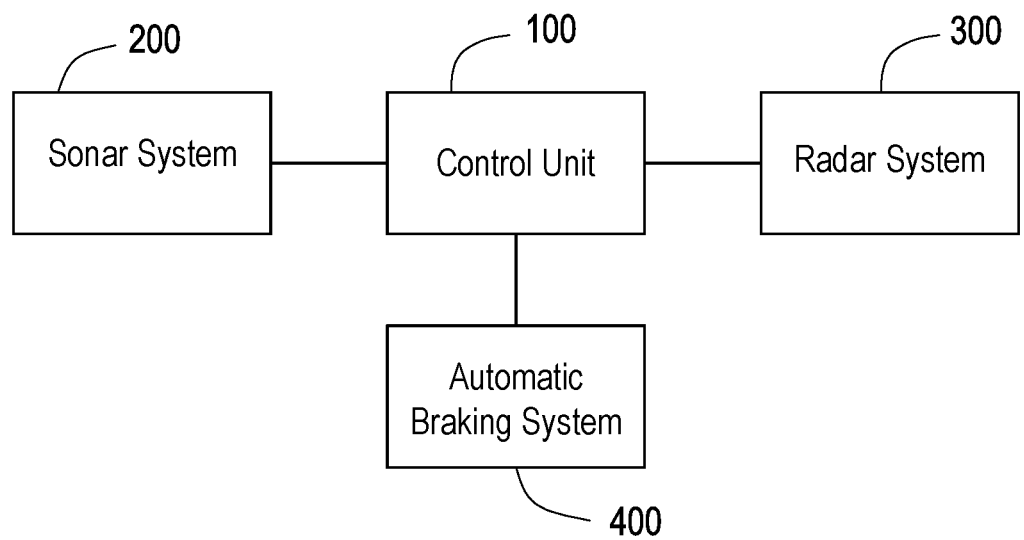
FIG. 5 is a schematic diagram illustrating a control device according to an embodiment of the disclosure.

FIG. 5 is a schematic diagram illustrating a control device according to an embodiment of the disclosure. Referring to FIG. 5, the control device 1 is a control device to perform an automatic stop of the vehicle 10. That is to say, the control device 1 is used to perform automatic braking of the vehicle 10 when the obstacle O is detected. The control device 1 is disposed on the vehicle 10. The control device 1 includes a control unit 100. The control unit 100 includes, for example, a processor and/or a memory.

Referring to FIG. 5, the vehicle 10 includes a sonar system 200, a radar system 300 and an automatic braking system 400. The sonar system 200 is an example of a sonar, and the radar system 300 is an example of the radar. The sonar system 200, the radar system 300 and the automatic braking system 400 are disposed on the vehicle 10. In the present embodiment of the disclosure, the sonar system 200, the radar system 300 and the automatic braking system 400 are part of the control device 1. However, in another embodiment of the disclosure, the sonar system 200, the radar system 300 and the automatic braking system 400 may be part of the vehicle 10.

The radar system 300 may be, for example, an array radar. The radar system detects a distance D to the obstacle O and detects a height of the obstacle O from a road surface. The sonar system 200 may include, for example, a sonar and a sonar microphone. The sonar system 200 detects the distance D to the obstacle O and detects a signal level of a reflected wave from the obstacle O.

The vehicle 10 may further include a power source (not shown), for example a battery, that electrically powers the control unit 100, the sonar system 200 and the radar system 300.

Figure 6:
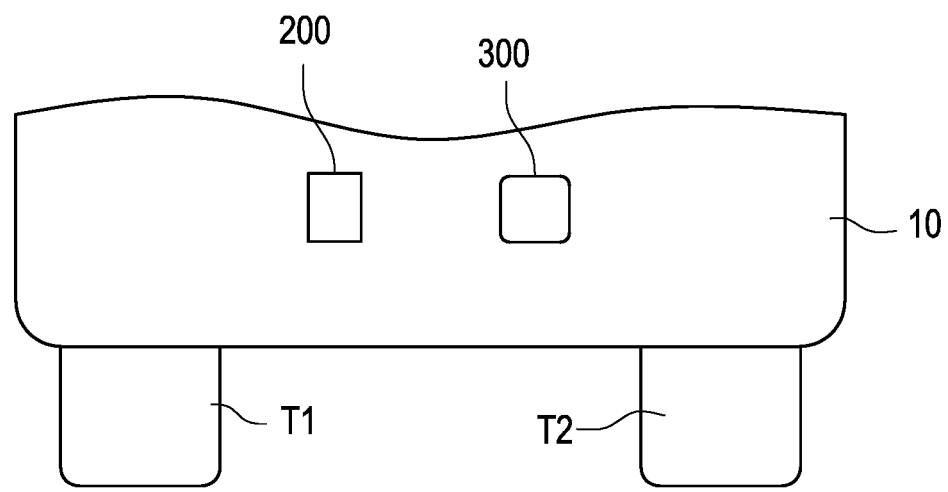
FIG. 6 is a schematic diagram illustrating a rear view of a vehicle according to an embodiment of the disclosure.

FIG. 6 is a schematic diagram illustrating a rear view of a vehicle according to an embodiment of the disclosure. Referring to FIG. 6, the sonar system 200 and the radar system 300 may be disposed, for example, at a rear of the vehicle 10. More specifically, the sonar system 200 and the radar system 300 may be disposed at a rear bumper of the vehicle 10 to detect the obstacle O that is at the rear of the vehicle 10. However, the disclosure is not limited thereto. In another embodiment of the disclosure, the sonar system 200 and the radar system 300 may be disposed at a front of the vehicle 10. More specifically, the sonar system 200 and the radar system 300 may be disposed at a front bumper of the vehicle 10 to detect the obstacle O that is at the front of the vehicle 10. In another embodiment of the disclosure, a first sonar system 200 and a first radar system 300 may be disposed at the front of the vehicle 10, and a second sonar system 200 and a second radar system 300 may be disposed at the rear of the vehicle 10. In another embodiment of the disclosure, a sonar system 200 and a radar system 300 may be disposed at a side or a plurality of sides of the vehicle 10. However, the disclosure is not limited thereto, and the sonar system 200 and the radar system 300 may be disposed according to requirements.

Figure 7:
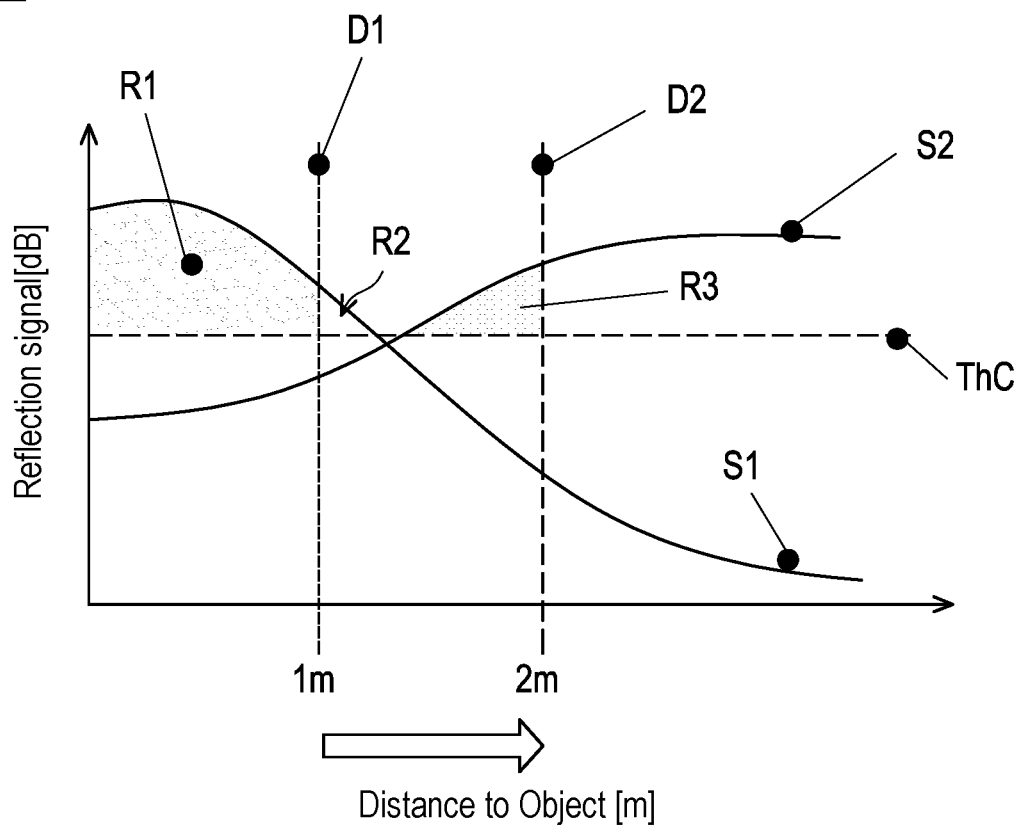
FIG. 7 is a schematic graph illustrating a sonar reflection signal of an obstacle according to an embodiment of the disclosure.

FIG. 7 is a schematic graph illustrating a sonar reflection signal of an obstacle according to an embodiment of the disclosure. Referring to FIG. 7, a first signal S1 depicts a signal level S of a reflected sonar wave from the obstacle O having relatively large height, such as from the first obstacle O1 shown in FIG. 1. In addition, a second signal S2 depicts a signal level S of the reflected sonar wave from the obstacle O having relatively small height, such as from the second obstacle O2 shown in FIG. 2. That is to say, the first signal S1 and the second signal S2 are both examples of the signal level S of the reflected sonar wave from the obstacle O.

Referring to FIG. 7, the control unit 100 is configured to output a signal for triggering the automatic stop of the vehicle 10 when the signal level S(S1, S2) of the reflected sonar wave from the obstacle O(O1, O2) is greater than a predetermined threshold. The signal that is outputted by the control unit 100 may be a wired signal or a wireless signal. In the present embodiment, the signal is the wired signal. More specifically, the control unit 100 outputs the signal for triggering the automatic stop of the vehicle to the automatic braking system 400. After the automatic braking system 400 receives the signal from the vehicle 10, the automatic braking system 400 may trigger the automatic braking of the vehicle by using a brake actuator, a hydraulic braking system and/or the like. By applying the automatic brake, the vehicle 10 may be prevented from colliding with the obstacle O, or the collision impact between the vehicle 10 and the obstacle O may be reduced.

It should be noted, in an embodiment of the disclosure, the automatic braking of the vehicle 10 may be triggered regardless of the signal level S of the reflected sonar wave. That is to say, in an embodiment of the disclosure, the automatic braking of the vehicle 10 may be triggered even when the signal level S of the reflected sonar wave is less than the predetermined threshold, if the radar system 300 detects that the height of the obstacle O is a height which may cause damage to the vehicle 10 (for example, tire, chassis, bumper or the like). For example, the automatic braking of the vehicle 10 may be triggered when the height of the obstacle O is greater than 20 cm.

In the embodiment shown in FIG. 7, the predetermined threshold is set to a constant threshold ThC. In the present embodiment, the constant threshold ThC is a constant value regardless of the distance to the obstacle O(O1, O2). In other words, the constant threshold ThC is not a dynamic threshold. That is to say, the constant threshold ThC is substantially constant and does not change when a distance between the vehicle 10 and the obstacle O(O1, O2) changes.

Referring to FIG. 7, the control unit 100 is configured to trigger the automatic stop of the vehicle 10 when the signal level S(S1, S2) is greater than the constant threshold ThC. On the other hand, the control unit 100 is configured to not trigger the automatic stop of the vehicle when the signal level S(S1, S2) is less than the constant threshold ThC.

In the example shown in FIG. 7, the first signal S1 (of the first obstacle O1 having relatively large height) is greater than the constant threshold ThC when the distance to the first obstacle O1 is less than approximately 1.3 meters. On the other hand, the second signal S2 (of the second obstacle O2 having relatively small height) is greater than the constant threshold ThC when the distance to the second obstacle O2 is greater than approximately 1.4 meters.

As described in the background above, the user may desire the vehicle 10 to ride up over the obstacle O having small height instead of triggering the automatic braking for automatic stop of the vehicle 10. For example, the control unit 100 may be configured to not trigger the automatic braking of the vehicle 10 when the distance D to the obstacle O is greater than a predetermined distance threshold. For example, the predetermined distance threshold for triggering the automatic braking may be set to a first predetermined distance threshold D1, for example, of 1 meters. That is to say, the control unit 100 is configured to not trigger the automatic braking when the signal level S is greater than the constant threshold ThC, if the distance D to the obstacle O is greater than the first predetermined distance threshold D1. On the other hand, the control unit 100 is configured to trigger the automatic braking when the signal level S is greater than the constant threshold ThC, if the distance D to the obstacle O is less than the first predetermined distance threshold D1. When the predetermined distance threshold for triggering the automatic braking is set to the first predetermined distance threshold D1, the automatic braking of the vehicle 10 is triggered when the signal level S of the reflected sonar wave from the obstacle O falls in a first region R1, but the automatic braking of the vehicle is not triggered when the signal level S of the reflected sonar wave from the obstacle O falls in a second region R2 and a third region R3.

However, the predetermined distance threshold may be set according to requirements. In some cases, it may be desirable to increase the predetermined distance threshold such that the vehicle 10 may have a greater distance to come to a stop. For example, the braking may be applied smoother instead of abruptly when the predetermined distance threshold is increased. For example, the predetermined distance threshold may be increased to a second predetermined distance threshold D2, for example, of 2 meters. In this case, the automatic braking of the vehicle 10 is triggered when the signal level S of the reflected sonar wave from the obstacle O falls in the first region R1, the second region R2 and the third region R3.

However, when the predetermined distance threshold is set to the second predetermined distance threshold D2, then the third region R3 becomes a brake malfunction region. That is to say, the user may desire the vehicle 10 to ride up over the obstacle O having small height, however the automatic stop of the vehicle 10 is triggered at the third region R3.

Therefore, a solution is needed in which the automatic braking of the vehicle is not triggered in the third region R3 even in the situation when the predetermined distance threshold is increased to the second predetermined distance threshold D2.

Figure 8:
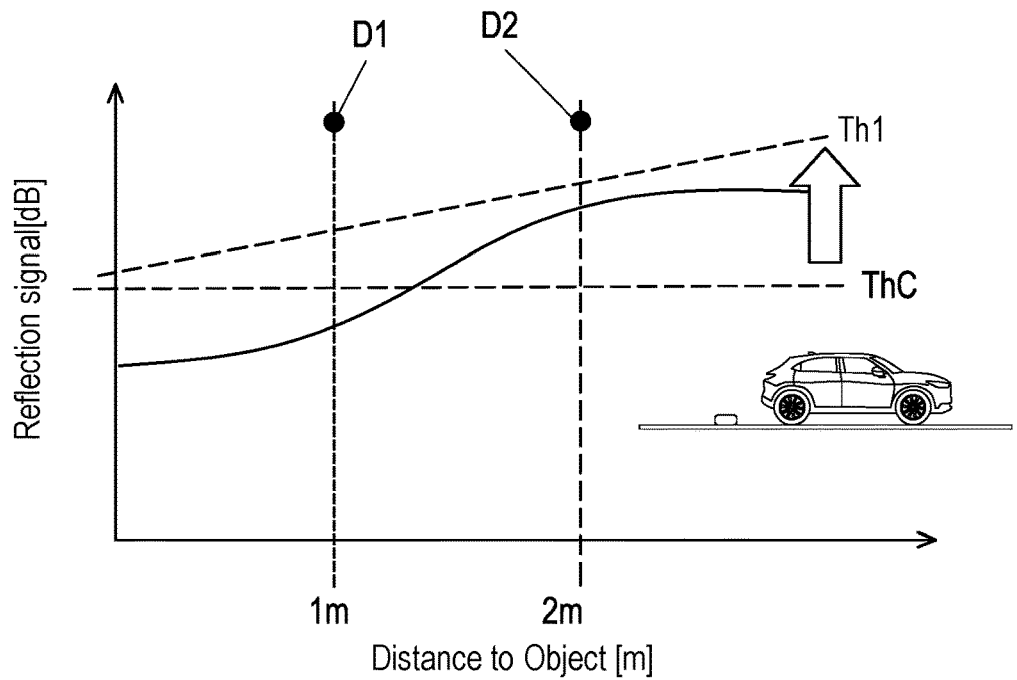
FIG. 8 is a schematic graph illustrating a first predetermined threshold for triggering the automatic stop of the vehicle according to an embodiment of the disclosure.
Figure 9:
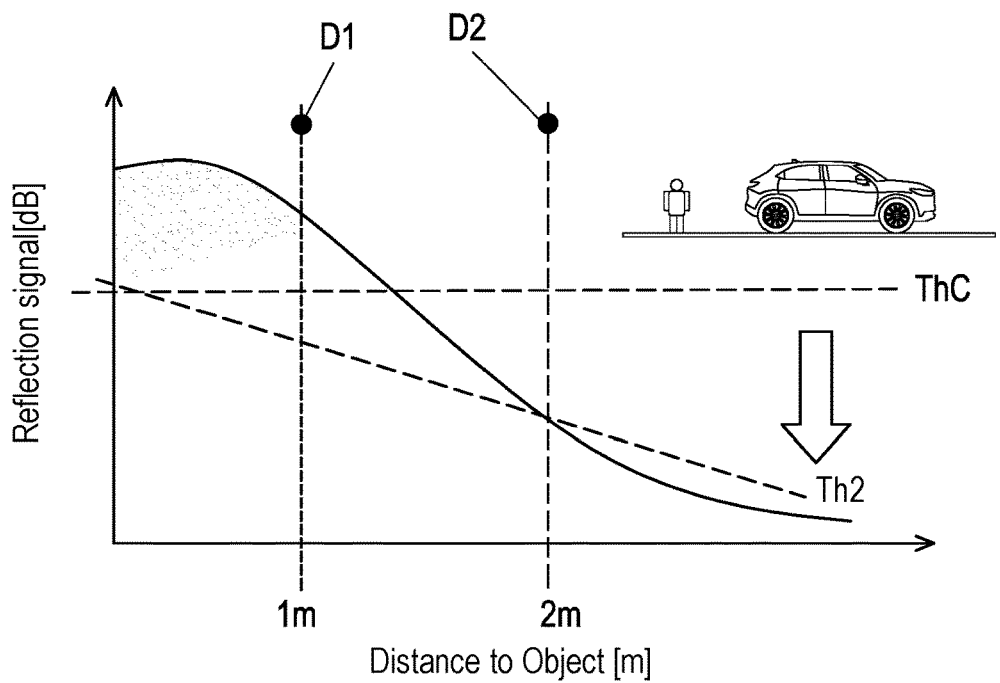
FIG. 9 is a schematic graph illustrating a second predetermined threshold for triggering the automatic stop of the vehicle according to an embodiment of the disclosure.

FIG. 8 is a schematic graph illustrating a first predetermined threshold for triggering the automatic stop of the vehicle according to an embodiment of the disclosure. FIG. 9 is a schematic graph illustrating a second predetermined threshold for triggering the automatic stop of the vehicle according to an embodiment of the disclosure. Referring to FIG. 8 and FIG. 9, in the present embodiment, the control unit 100 is configured to change the predetermined threshold for triggering the automatic stop of the vehicle 10 between a first predetermined threshold Th1 for example as shown in FIG. 8, and a second predetermined threshold Th2 for example as shown in FIG. 9, based on the height of the obstacle O detected by the radar system.

More specifically, the control unit 100 changes the predetermined threshold to the first predetermined threshold Th1 shown in FIG. 8 when the height of the obstacle O is less than the predetermined height H, and the control unit 100 changes the predetermined threshold to the second predetermined threshold Th2 shown in FIG. 9 when the height of the obstacle O is greater than the predetermined height H.

In this way, the automatic braking of the vehicle 10 is not triggered in the third region R3 even in the situation when the predetermined distance threshold is increased to the second predetermined distance threshold D2 of 2 meters.

Referring to FIG. 8, in the present embodiment, the first predetermined threshold Th1 is greater than the signal level S of the obstacle O at all distances D to the obstacle O. However, the disclosure is not limited thereto. For example, in another embodiment of the disclosure, the first predetermined threshold Th1 may be greater than and lesser than the signal level S of the obstacle O2 depending on the distance D to the obstacle O.

Referring to FIG. 9, the second predetermined threshold Th2 is greater than and lesser than the signal level S of the obstacle O depending on the distance D to the obstacle O. However, the disclosure is not limited thereto. For example, the second predetermined threshold Th2 may be lesser than the signal level S of the obstacle O at all distances D to the obstacle O.

Referring to FIG. 8 and FIG. 9, in the present embodiment, the first predetermined threshold Th1 dynamically changes according to the distance D to the obstacle O, and the second predetermined threshold Th2 dynamically changes according to the distance D to the obstacle O. However, the disclosure is not limited thereto. In another embodiment of the disclosure, the first predetermined threshold Th1 and the second predetermined threshold Th2 may both be constant values, instead of dynamically changing based on the distance D to the obstacle O. Namely, the first predetermined threshold Th1 may be a first constant value, and the second predetermined threshold Th2 may be a second constant value, wherein the first constant value is a value different from the second constant value.

In another embodiment of the disclosure, one of the first predetermined threshold Th1 or the second predetermined threshold Th2 may dynamically change according to the distance D to the obstacle O, while the other of the first predetermined threshold Th1 or the second predetermined threshold Th2 may be a constant value.

Referring to FIG. 8 and FIG. 9, in the present embodiment, the first predetermined threshold Th1 increases when the distance D to the obstacle O increases, and the second predetermined threshold Th2 decreases when the distance D to the obstacle O increases. However, the disclosure is not limited thereto. In another embodiment of the disclosure, the first predetermined threshold Th1 may decrease when the distance D to the obstacle O increases, and the second predetermined threshold Th2 may increase when the distance D to the obstacle O increases.

In another embodiment of the disclosure, the first predetermined threshold Th1 may dynamically change based on the distance D to the obstacle O by including a combination of any numbers of increasing, decreasing, and constant. The first predetermined threshold Th1 may increase and/or decreasing by a curve or by a slope and the like. For example, the first predetermined threshold Th1 may include a combination of increasing and decreasing, increasing and constant, decreasing and constant, increasing decreasing and constant, changing between a first constant and a second constant step wise, changing between a first constant and a second constant by a slope or curve and the like. Similarly, the second predetermined threshold Th2 may dynamically change based on the distance D to the obstacle O by including a combination of any numbers of increasing, decreasing, and constant. The second predetermined threshold Th2 may increase and/or decreasing by a curve or by a slope and the like. For example, the second predetermined threshold Th2 may include a combination of increasing and decreasing, increasing and constant, decreasing and constant, increasing decreasing and constant, changing between a first constant and a second constant step wise, changing between a first constant and a second constant by a slope or curve and the like. The above combinations are described as examples only and the disclosure is not limited thereto.

Furthermore, the order of increasing, decreasing and constant is not intended to limit the disclosure, and may be set according to requirements.

Referring to FIG. 8 and FIG. 9, in the present embodiment, an average value of the first predetermined threshold Th1 is greater than an average value of the second predetermined threshold Th2. For example, the average value of the first predetermined threshold Th1 is greater than the constant threshold ThC, while the average value of the second predetermined threshold Th2 is less than the constant threshold ThC. However, the disclosure is not limited thereto. In another embodiment of the disclosure, the average value of the first predetermined threshold Th1 may be lesser than the average value of the second predetermined threshold Th2.

Figure 10:
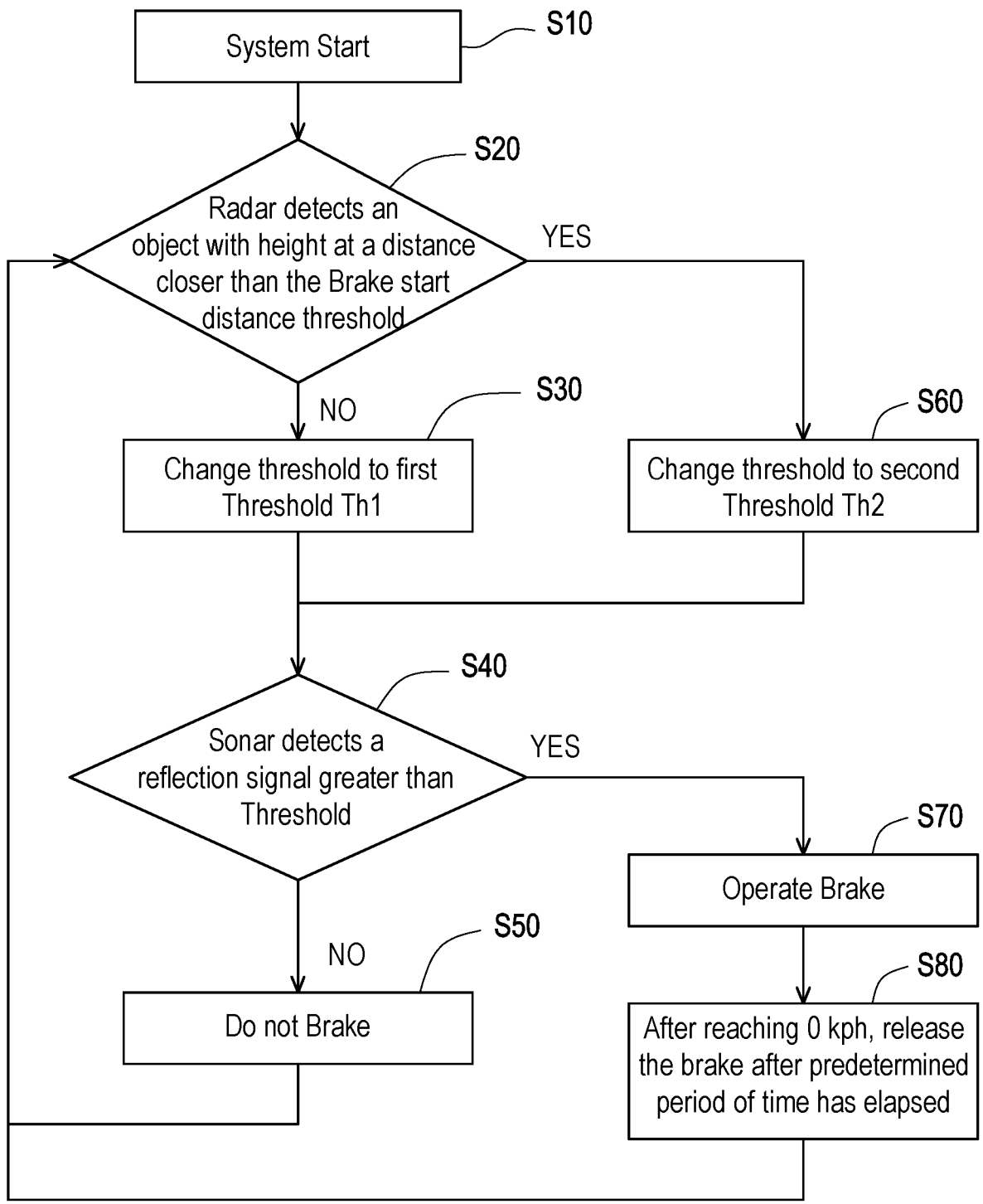
FIG. 10 is a flow chart diagram illustrating a flow for changing a predetermined threshold for triggering the automatic stop of the vehicle between a first predetermined threshold and a second predetermined threshold according to an embodiment of the disclosure.

FIG. 10 is a flow chart diagram illustrating a flow for changing a predetermined threshold for triggering the automatic stop of the vehicle between a first predetermined threshold and a second predetermined threshold according to an embodiment of the disclosure. Referring to FIG. 10, in step S20, the radar system 300 detects whether the object O with large height is detected at a distance D closer than the brake start distance threshold (For example, the first predetermined distance threshold D1 or the second predetermined distance threshold D2 depending on requirements).

In step S30, when the object O with large height is not detected (for example, the object with small height is detected) at a distance D closer than the brake distance threshold, then the control unit 100 changes the predetermined threshold for triggering the automatic stop of the vehicle 10 to the first predetermined threshold Th1.

In step S60, when the object O with large height is detected at a distance D closer than the brake distance threshold, then the control unit 100 changes the predetermined threshold for triggering the automatic stop of the vehicle 10 to the second predetermined threshold Th2.

Next, in step S40, the sonar system 200 detects whether a reflection signal is greater than the predetermined threshold (the first predetermined threshold Th1 or the second predetermined threshold Th2 depending on whether the predetermined threshold was set by the step S30 or the step S60).

In step S70, when the sonar system 200 detects that the reflection signal is greater than the predetermined threshold (the first predetermined threshold Th1 or the second predetermined threshold Th2 depending on whether the predetermined threshold was set by the step S30 or the step S60), then the control unit 100 triggers the automatic braking of the vehicle 10 (Operate brake).

In step S80, when the vehicle speed reaches 0 kph (complete stop) after the brake is operated in step S70, then the control unit 100 releases the brake after a predetermined period of time has elapsed. The predetermined period of time may be, for example, 2.0 seconds. However, the disclosure is not limited thereto, and the predetermined period of time may be set according to requirements.

In step S50, when the sonar system 200 detects the reflection signal is smaller than the predetermined threshold (first predetermined threshold Th1 or second predetermined threshold Th2), then the control unit 100 does not trigger the automatic braking of the vehicle 10 (Do not brake).

In an embodiment of the disclosure, when the height of the obstacle O is less than the predetermined height H, a user of the vehicle 10 is notified before the vehicle 10 passes the obstacle O. In more detail, a speaker disposed on the vehicle 10 may notify the user that the obstacle O having small height is detected and about to be traveled over by the vehicle 10. In another embodiment, the vehicle 10 may notify the user that the obstacle O having small height is detected and about to be traveled over by the vehicle 10 via the console of the driver.

Figure 11:
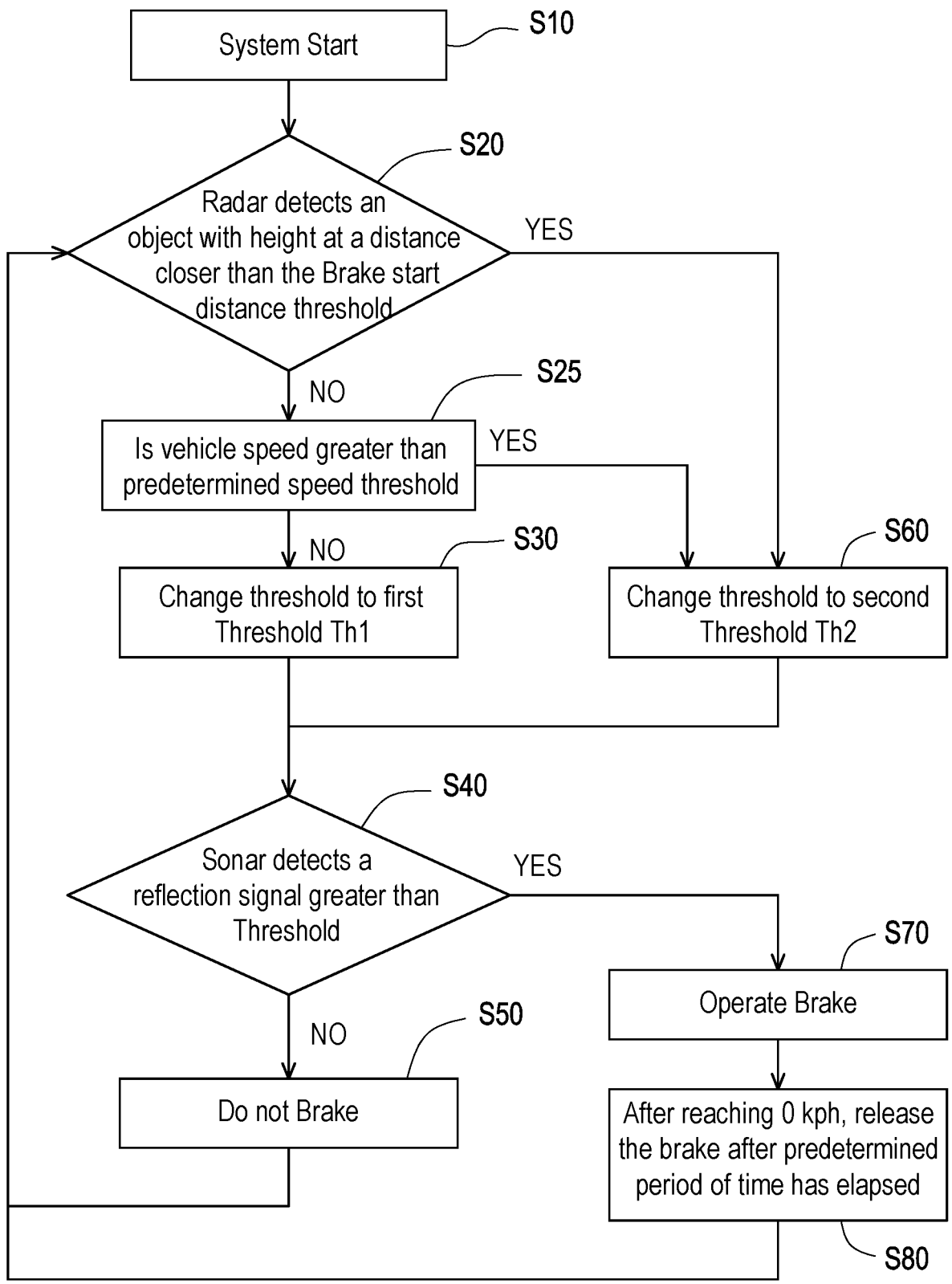
FIG. 11 is a flow chart diagram illustrating a flow for changing a predetermined threshold for triggering the automatic stop of the vehicle between a first predetermined threshold and a second predetermined threshold according to an embodiment of the disclosure.

FIG. 11 is a flow chart diagram illustrating a flow for changing a predetermined threshold for triggering the automatic stop of the vehicle between a first predetermined threshold and a second predetermined threshold according to an embodiment of the disclosure. The flow chart of FIG. 11 is similar to the flow chart of FIG. 10, except FIG. 11 includes an additional step S25.

Referring to the embodiment in FIG. 11, in the step S25, the control unit 100 further detects whether a travel speed of the vehicle 10 is greater than a predetermined speed threshold. When the travel speed of the vehicle 10 is greater than the predetermined speed threshold, the control unit 100 does not change the predetermined threshold to the first predetermined threshold Th1, but rather changes/maintains the predetermined threshold to the second predetermined threshold Th2. In other words, when the vehicle 10 is travelling at a speed greater than the predetermined speed, the predetermined threshold is not changed to the first predetermined threshold Th1 even when the height of the obstacle O is less than the predetermined height. In this way, when the vehicle 10 is traveling at relatively high speed greater than the predetermined speed threshold, the automatic stop of the vehicle 10 is triggered even when the obstacle has relatively small height. In this way, the vehicle 10 will not ride up over the step difference such as the curb at a high speed (at greater than a predetermined speed threshold), and abrupt shock may be prevented. The predetermined speed may be set to, for example, 5 kph. However, the disclosure is not limited thereto, and the predetermined speed may be set according to requirements.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control device for automatic stop of a vehicle, wherein the vehicle includes a radar and a sonar, the radar detecting a distance to an obstacle and detecting a height of the obstacle from a road surface, the sonar detecting the distance to the obstacle and detecting a signal level of a reflected wave from the obstacle, the control device comprising:
   a control unit, comprising a processor, configured to output a signal for triggering the automatic stop of the vehicle when the signal level of the reflected wave from the obstacle is greater than a predetermined threshold,
   wherein the control unit is configured to change the predetermined threshold for triggering the automatic stop of the vehicle between a first predetermined threshold and a second predetermined threshold based on the height of the obstacle detected by the radar.

2. The control device according to claim 1, wherein the control unit changes the predetermined threshold to the first predetermined threshold when the height of the obstacle is less than a predetermined height, and the control unit changes the predetermined threshold to the second predetermined threshold when the height of the obstacle is greater than the predetermined height.

3. The control device according to claim 2, wherein the first predetermined threshold dynamically changes according to the distance to the obstacle.

4. The control device according to claim 2, wherein the second predetermined threshold dynamically changes according to the distance to the obstacle.

5. The control device according to claim 2, wherein the first predetermined threshold dynamically changes according to the distance to the obstacle, and the second predetermined threshold dynamically changes according to the distance to the obstacle.

6. The control device according to claim 2, wherein when the vehicle is travelling at a speed greater than a predetermined speed, the predetermined threshold is not changed to the first predetermined threshold even when the height of the obstacle is less than the predetermined height.

7. The control device according to claim 5, wherein when the vehicle is travelling at a speed greater than a predetermined speed, the predetermined threshold is not changed to the first predetermined threshold even when the height of the obstacle is less than the predetermined height.

8. The control device according to claim 2, wherein when the height of the obstacle is less than the predetermined height, a user of the vehicle is notified before the vehicle passes the obstacle.

9. The control device according to claim 1, comprising:
   the radar; and
   the sonar.

10. A vehicle, comprising:
    a radar, detecting a distance to an obstacle and detecting a height of the obstacle from a road surface;
    a sonar, detecting the distance to the obstacle and detecting a signal level of a reflected wave from the obstacle; and
    a control device for automatic stop of the vehicle, comprising:
    a control unit, comprising a processor, configured to output a signal for triggering the automatic stop of the vehicle when the signal level of the reflected wave from the obstacle is greater than a predetermined threshold,
    wherein the control unit is configured to change the predetermined threshold for triggering the automatic stop of the vehicle between a first predetermined threshold and a second predetermined threshold based on the height of the obstacle detected by the radar.

* * * * *